US007017612B2

(12) United States Patent
Ott

(10) Patent No.: US 7,017,612 B2

(45) Date of Patent: Mar. 28, 2006

(54) CONDUIT FOR PAINT

(75) Inventor: Winfried Ott, Rodgau (DE)

(73) Assignee: LacTec Gesellschaft für moderne Lackiertechnik mbH, Rodgau (DE)

( * ) Notice: Subject to any disclaimer, the term of this patent is extended or adjusted under 35 U.S.C. 154(b) by 0 days.

(21) Appl. No.: 10/811,797

(22) Filed: Mar. 26, 2004

(65) Prior Publication Data

US 2004/0188472 A1 Sep. 30, 2004

(30) Foreign Application Priority Data

Mar. 27, 2003 (DE) ................................ 103 13 695

(51) Int. Cl.
*F16L 55/12* (2006.01)

(52) U.S. Cl. ........................... 138/93; 138/119; 138/98

(58) Field of Classification Search .................. 138/93, 138/118, 119, 97, 98, 114

See application file for complete search history.

(56) References Cited

U.S. PATENT DOCUMENTS

| | | | | |
|---|---|---|---|---|
| 1,180,182 | A * | 4/1916 | Petersen | 138/93 |
| 1,348,332 | A * | 8/1920 | Stremel | 264/31 |
| 1,510,212 | A * | 9/1924 | Du Bois | 15/104.31 |
| 2,264,822 | A * | 12/1941 | Ahern | 138/93 |
| 2,508,659 | A | 5/1950 | Brown | |
| 2,678,666 | A * | 5/1954 | Theis et al. | 138/93 |
| 3,626,985 | A * | 12/1971 | Erickson et al. | 138/45 |
| 4,160,464 | A * | 7/1979 | Ballinger | 138/93 |
| 4,272,021 | A * | 6/1981 | Standal | 239/106 |
| 5,234,034 | A * | 8/1993 | Lyon | 138/93 |
| 6,405,994 | B1 * | 6/2002 | Chen | 251/61.1 |

FOREIGN PATENT DOCUMENTS

| | | |
|---|---|---|
| DE | 606028 | 11/1934 |
| DE | 937321 | 1/1956 |
| DE | 101 01 056 A1 | 6/2002 |
| WO | 9408105 | 4/1994 |
| WO | 03/086671 A1 | 10/2003 |

* cited by examiner

*Primary Examiner*—Patrick Brinson
(74) *Attorney, Agent, or Firm*—Friedrich Kueffner

(57) ABSTRACT

A paint conduit has a conduit wall enclosing an interior and a cleaning device that has a hose arranged in the interior and a pressurized fluid source connected to the hose. The hose is expandable at least in a radial direction of the hose and is inflated by the pressurized fluid source to displace the paint, present in the paint conduit, from the paint conduit when new paint is to be conveyed through the paint conduit.

7 Claims, 1 Drawing Sheet

CONDUIT FOR PAINT

BACKGROUND OF THE INVENTION

1. Field of the Invention

The invention relates to a conduit for paint comprising a conduit wall, an interior, and a cleaning device.

2. Description of the Related Art

The conduit for paint serves for transporting a paint, for example, in the form of a varnish or enamel paint, that is to be applied to a surface, from a source to an application location, for example, a dispensing device. The dispensing device, for example, can be a spray gun. The source can be a paint changer via which different paints or varnishes can be fed to the paint conduit. Of course, other configurations for the use of such a paint conduit are conceivable.

When different paints are to be transported sequentially through the paint conduit, it is necessary to clean the conduit for each individual paint. For this purpose, first the paint present within the interior of the paint conduit must be removed. In principle, this is possible in that a solvent is guided through the interior and the paint contained in the interior is flushed out in this way. However, this causes partially a significant loss of paint which usually is to be avoided. Instead, so-called pigs or scrapers are used, i.e., bodies that are moved through the paint conduit and wipe or scrape clean the inner wall surface of the conduit wall. In this way, a large amount of the paint contained in the interior of the paint conduit can be returned into the reservoir or into an annular conduit. The residues of paint that still remain in the interior can then be removed by a solvent.

Even though the use of such a pig or scraper is widely accepted in practice, its use is relatively cumbersome. Either the pig (scraper) must be inserted into the interior of the paint conduit or the pig or scraper must be positioned in a parking position within the paint conduit as long as it is not needed.

SUMMARY OF THE INVENTION

It is an object of the present invention to facilitate cleaning of a conduit for paint.

In accordance with the present invention, this is achieved in that, in the interior of the conduit, a hose is arranged that can be connected to a pressurized fluid source and forms at least a portion of the cleaning device.

The hose can remain stationary within the interior of the paint conduit during normal transport of a paint through the paint conduit. Provided that the hose is configured accordingly, the hose does not impair the function of the paint conduit, i.e., the usable cross-section of the interior is not noticeably reduced. When the interior is to be cleaned, the hose is "inflated" by means of the pressurized fluid source, i.e., the hose is pressurized. The hose then contacts the inner wall surface of the conduit wall and reduces in this way the cross-section that is still available for the paint. With a corresponding pressure loading, the hose will completely contact or entirely rests against the inner wall surface of the conduit wall so that the interior is filled completely with the hose. Therefore, there is no more space available for the paint. The paint is thus displaced by means of the hose into a return outlet where it is removed. At the return outlet, for example, a reservoir container, a pump, or an annular conduit can be arranged for receiving the paint. When the pressure is released from the hose, the hose will collapse again. During the subsequent feeding of paint, the pressure of the paint that must not be excessively high is sufficient to reduce the hose to its smallest volume. This can be achieved by means of a corresponding control of the pressurized fluid source that enables a sufficient escape of the pressurized fluid out of the interior of the hose. A reduction of the outer dimensions of the hoses can also be achieved earlier, for example, when a cleaning fluid is guided through the interior of the paint conduit. With this configuration, it is no longer required to insert a pig (scraper) in the interior and guide it through the interior. Instead, a substitute for the pig or scraper is used, i.e., the hose that has a variable shape wherein the shape change is controlled by the pressurized fluid source. The paint is essentially squeezed out of the paint conduit. The pressurized fluid can be, for example, a pressurized gas such as compressed air. However, it is also possible to employ a liquid as a pressurized fluid.

Preferably, the hose is expandable at least in the radial direction. The hose is configured such that in the unexpanded state it has an outer diameter that is smaller than the inner diameter of the conduit wall. In order to achieve finally the contact of the hose on the inner wall surface of the conduit wall, the hose must be expanded somewhat. The expansion must not be excessively large. The expansion however prevents that folds will form on the exterior of the hose which could result in pockets in which paint residues could collect. When the hose instead is expanded, it is smooth when resting against the inner wall surface of the conduit wall and forces the paint out of areas where the hose is resting against the conduit wall.

Preferably, the paint conduit has a controllable return outlet. Accordingly, a certain pressure is maintained within the paint that is to be displaced. This pressure has the advantage that the hose can gradually expand from the pressurized fluid source toward the return outlet. The widening or expansion can be realized only against the pressure of the liquid that is present within the paint conduit. The hose is thus not inflated over its entire length at once. Instead, a kind of migrating movement of the leading end, i.e., the end facing the return outlet, is generated. The paint that is present within the paint conduit is thus displaced gradually out of the paint conduit. However, this displacement can be performed relatively fast.

Preferably, the hose is closed off at its end facing away from the pressurized fluid source or has a closable exit from the interior. In both cases, it is ensured that the pressurized fluid expands exclusively within the interior of the hose and does not pass into the paint conduit. Moreover, it is ensured in this way that there is actually a pressure build-up in the hose that is sufficient for squeezing the paint out of the intermediate space between the hose and the conduit wall.

Preferably, the hose is secured or fixed in position at least in the area of the end facing away from the pressurized fluid source of the interior. In this way, it is prevented that the hose is pushed together in the axial direction by incoming paint and in this way reduces the open cross-section of the paint conduit. The fixation or securing action can be achieved in that the end of the hose has a connection to the conduit wall or a part that is fixed relative to the conduit wall, for example, a paint changer.

DESCRIPTION OF THE PREFERRED EMBODIMENTS

Figure 1:
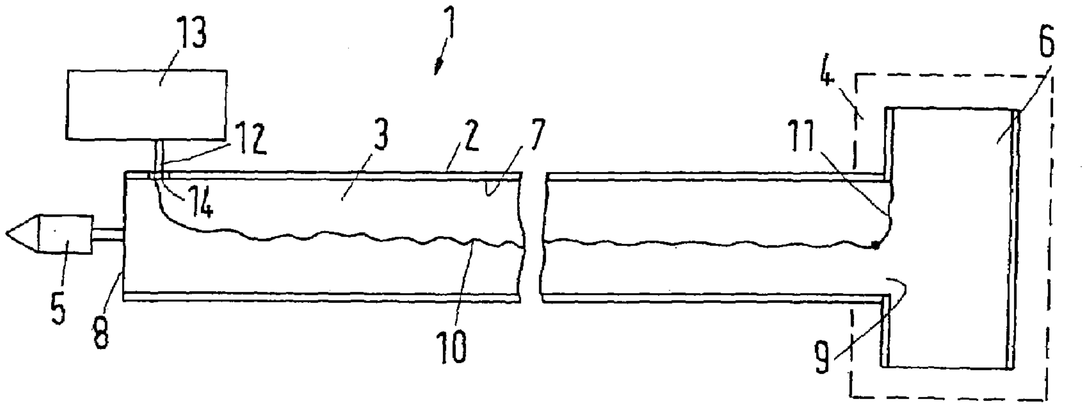
FIG. 1 shows a conduit for paint in the operating state.
Figure 2:
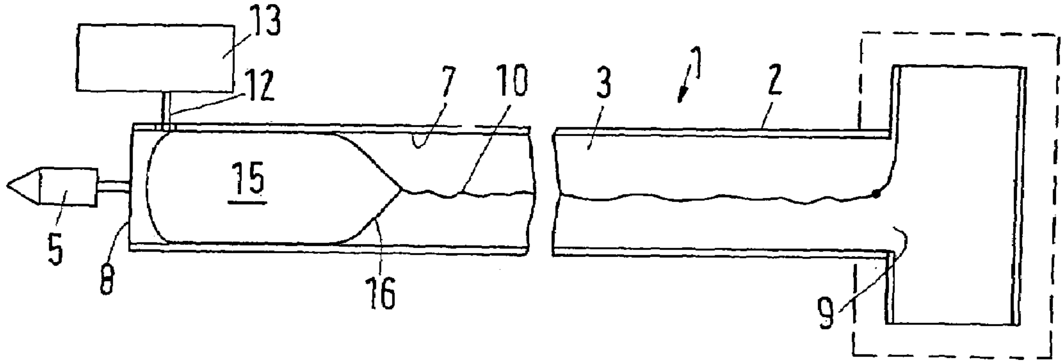
FIG. 2 shows the conduit for paint at the beginning of the cleaning process.

FIG. 1 shows a paint conduit 1 having a conduit wall 2 with a hollow interior 3. The paint conduit 1 forms a connection between the paint changer 4, illustrated only schematically, and the spraying device 5. The spraying device 5 is only schematically illustrated. It is usually connected by means of a larger conduit cross-section to the paint conduit 1. The illustration of FIG. 1 is only schematic and does not represent the real connecting conditions between the paint conduit 1 and the spray gun 5. The description is limited to a section of the paint conduit 1 that is to be cleaned as explained in the following.

The paint changer 4 provides a connection between the paint conduit 1 and an annular conduit 6 that is also only schematically illustrated. Through the annular conduit 6, a paint is supplied under pressure so that it can be ejected (sprayed) from the spray gun 5. The paint can be, for example, a lacquer or enamel for applying a coating to a surface.

The paint changer 4 is provided in order to connect different annular conduits 6 to the paint conduit 1 so that different paints can be supplied through the paint conduit 1 to the spray gun 5. Before the paint change can be carried out, the paint conduit 1 must be cleaned.

A mechanical precleaning is conventionally carried out in that a pig or scraper, not illustrated in detail, is introduced into the paint conduit in order to scrape or wipe the paint from the inner wall surface of the conduit wall 2. Such a pig or scraper is guided from a first end 8 of the paint conduit 1 located adjacent to the spray gun 5 to the second end 9 of the paint conduit 1 neighboring the paint changer 4.

In order to replace such a pig or scraper, in the present invention a hose 10 is arranged in the interior 3 of the paint conduit 1. This hose 10 is fastened with one end by means of a fastening device 11 to the second end 9 of the paint conduit 1. The other end of the hose 10 is connected via pressurized fluid intake 12 to a pressurized fluid source 13. The pressurized fluid intake 12 extends through an opening 14 in the conduit wall 2.

In the operating mode of FIG. 1, the pressurized fluid source 13 is switched such that in the hose 10 a relatively low pressure, for example, atmospheric pressure is present. The pressure in the hose 10 is in any case significantly smaller than the pressure in the interior 3 that is, for example, generated by the pressure of the supplied paint so that the hose 10, under the effect of the pressure present within the interior 3, is compressed and practically does not reduce the open flow cross-section of the interior 3. The hose 10 is secured in its position by a securing device 11 with regard to the incoming paint. Accordingly, there is no risk that it is folded or pushed together and in this way reduces the open flow cross-section of the interior.

When a paint change is to be carried out, first the supply of paint through the paint changer 4 is interrupted. For example, the pressure in the annular conduit 6 can be lowered.

Subsequently, the pressurized fluid source 13 is turned on that fills the hose 10 with the pressurized fluid. The pressurized fluid can be, for example, a pressurized gas, for example, compressed air. However, it is also possible to employ a pressurized liquid.

In any case, the hose 10 is filled against the pressure of the paint that is still within the paint conduit 1. This has the result that the hose 10 is not uniformly filled over its entire length but first a pressure cushion 15 results whose leading end 16 moves in the direction toward the second end 9 of the paint conduit 1. Accordingly, the hose 10 gradually will contact or come to rest against the inner wall surface 7 of the conduit wall 2 and will gradually fill the interior 3 completely; thus, there will be no space for paint residues.

The hose 10 is expandable at least in the radial direction. In the unexpanded state, it can have an outer diameter which is somewhat smaller than the inner diameter of the conduit wall 2. With a corresponding supply of pressurized fluid, the hose 10 is however expanded such that it can come to rest against the inner wall surface 7 of the conduit wall 2. The expansion ensures that this contact is realized practically free of any folds so that no pockets or nests can form in which paint residues can collect.

Figure 3:
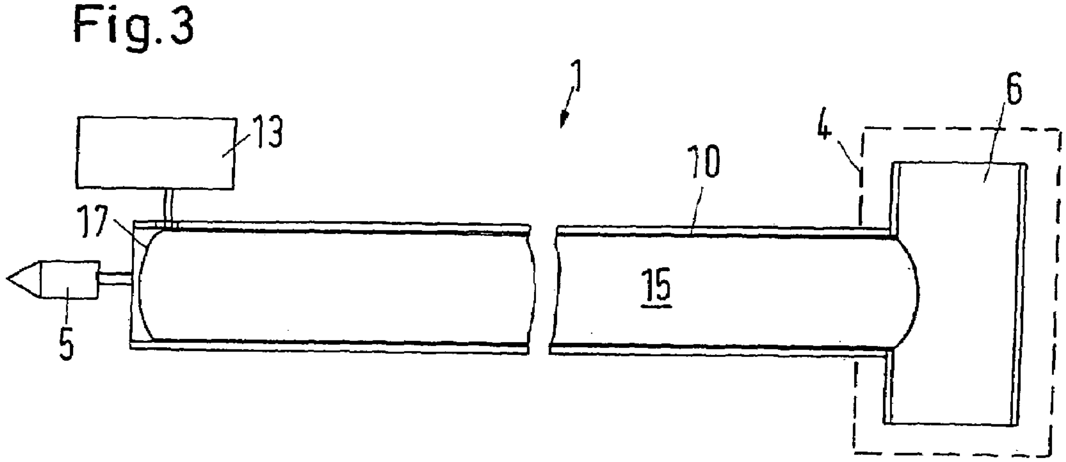
FIG. 3 shows the conduit for paint at a later stage during the cleaning process.

As can be seen in FIG. 3, in a final stage of the mechanical cleaning action, the interior chamber 3 is completely filled by the hose 10, i.e., the pressure cushion 15 is practically of the same size as the interior 3 of the paint conduit 1. The paint that was present within the interior 3 of the paint conduit 1 has been completely displaced into the annular conduit 6.

As in the case with a pig or scraper, areas 17 will remain in the interior 3 that cannot be freed of paint residues by means of the hose 10. However, the residues of paint remaining when employing the hose are relatively small. They are washed out of the paint conduit 1 in the subsequent flushing process with a flushing liquid. In order to simplify the drawing, the elements required for flushing the paint conduit are not illustrated.

While specific embodiments of the invention have been shown and described in detail to illustrate the inventive principles, it will be understood that the invention may be embodied otherwise without departing from such principles.

What is claimed is:

1. A paint conduit comprising:

a first end and a second end;

a conduit wall enclosing an interior;

a cleaning device comprising a hose arranged in the interior and a pressurized fluid source connected to one end of the hose via a pressurized fluid intake so as to hold the end of the hose at the first end of the conduit; and a fastening device arranged to connect another end of the hose to the second end of the conduit.

2. The paint conduit according to claim 1, wherein the hose is expandable at least in a radial direction of the hose.

3. The paint conduit according to claim 1, further comprising a controllable return outlet.

4. The paint conduit according to claim 1, wherein the pressurized fluid source is controllable.

5. The paint conduit according to claim 1, wherein the hose is closed at the end that is facing away from the pressurized fluid source.

6. The paint conduit according to claim 1, wherein the hose is provided with a closable exit from the interior.

7. The paint conduit according to claim 1, wherein the hose is secured relative to the paint conduit at least in the area of the end of the interior facing away from the pressurized fluid source.

* * * * *